Feb. 7, 1967 G. H. MAY 3,302,948

STACKING DEVICE FOR CARDS OR THE LIKE

Filed July 6, 1964 3 Sheets-Sheet 1

INVENTOR.
GORDON H. MAY

BY Otto Schmid, Jr.

ATTORNEY

STACKING DEVICE FOR CARDS OR THE LIKE

Filed July 6, 1964 3 Sheets-Sheet 2

United States Patent Office 3,302,948

Patented Feb. 7, 1967

3,302,948

STACKING DEVICE FOR CARDS OR THE LIKE

Gordon H. May, San Jose, Calif., assignor to International Business Machines Corporation, New York, N.Y., a corporation of New York Filed July 6, 1964, Ser. No. 380,318
10 Claims. (Cl. 271—71)

This invention relates to a stacking device and, more particularly, to a device for stacking record cards at high speed.

Prior stacking devices are not suitable for stacking record cards at high speed due to the stringent requirement to avoid contact with stationary stops or with other cards traveling at high velocity. Attempts have been made to solve this problem by providing overlap or slow-down stations to gradually reduce the velocity of the cards to the point where conventional stacking techniques can be used to stack the cards. It is a primary object of the present invention to provide a stacking device which occupies no more space than the conventional record card stacker, but which is capable of stacking record cards at very high rates.

At present the basic limitation on the overall operating speed of a data processing system is the speed of the input-output devices. In certain operations the processor of the data processing system must wait until data is read from a record card before proceeding with the programmed operation. The access time required to feed, read and stack a record card thus represents the loss of processing time, which it is desirable to make as short as possible. It is therefore another object of this invention to provide a device for stacking record cards in a minimum time suitable for an input-output device for a data processing system.

It is a further object of the invention to provide a random feed stacking device.

It is a still further object of this invention to provide a stacking device for record cards fed on call from a processor of a data processing system.

According to the invention, there is provided a device for stacking record cards moving at a high velocity comprising card position sensing means for generating a signal which indicates the card is in a predetermined position, a card arresting means which is actuated by the signal to move the card into contact with a slow speed feed roll to slow the cards down to a stacking speed, and a lateral motion device which is actuated to move the card so that following cards do not contact the card while there is substantial relative forward movement between the cards.

The foregoing and other objects, features and advantages of the invention will be apparent from the following more particular description of a preferred embodiment of the invention, as illustrated in the accompanying drawings.

FIG. 1 is a diagrammatic schematic top view of a record card stacker embodying the invention.

FIGS. 1*a* and 1*b* are views of the apparatus of FIG. 1 at later times showing the sequence of operations as a card moves into the stacker, is stacked, and is moved laterally from the path of the following card.

According to the invention, there is provided a device for stacking cards moving at a high velocity comprising card position sensing means 10 for generating a signal which indicates the card is in a predetermined position. A card arresting means 12 is actuated by the signal to move the card into contact with a slow speed feed means 14 to slow the card to a speed at which the card can be stopped without damage. A lateral motion device 16 is actuated to move the card laterally from the card path so that the following cards do not contact the card while there is substantial relative forward motion between the cards. The record cards may be fed by any device suitable for feeding cards along a card path at a high rate, such as 4,000 to 6,000 cards per minute. One suitable feeding device is described in my copending application Serial No. 332,819, filed December 23, 1963, entitled, "High Speed Card Feed."

Figure 1:
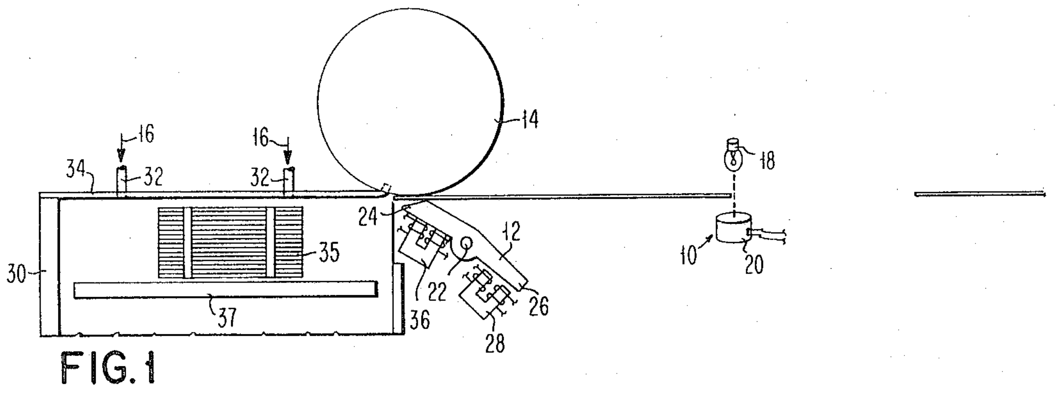

Referring to the drawings, in the embodiment of the invention shown in FIG. 1, the card position sensing means comprises a light source 18 and a solar cell 20. Light 18 and solar cell 20 are positioned on opposite sides of the card path so that an electrical output is generated in the solar cell when no card is passing by; however, when the light is blocked by a card moving along the card path, the output from the solar cell drops to the low state.

Figure 4:
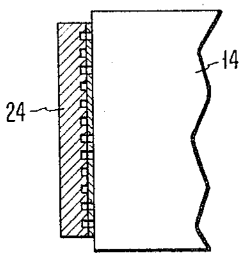
FIG. 4 is a section view along lines B—B of FIG. 1*a*.

The card arresting means comprises a member 26 mounted for pivotal movement about shaft 22. The shoe portion 24 of the arresting member 26, which is adjacent feeding means 14, is shaped to a contour complementary to feeding means 14 so that when control magnet 28 is energized the arresting member will move the card into contact with the feeding means 14. In the embodiment shown, feeding means 14 comprises a feed roll which is driven (by suitable gears or belts, not shown) at a speed so that the peripheral velocity of the feed roll is in a range in which record cards can be safely stacked without damage. A speed of approximately 100 inches per second is a safe velocity to stop the cards by the end stacker wall 30 without damage. The diameter of feed roll 14 is chosen to minimize wear on the surface, and also to prevent setting a permanent bend in the portion of the card that is contacted by the arresting means. In the embodiment shown, a diameter of approximately six inches for feed roll 14 is suitable. Feed roll 14 may be made of any suitable material having a higher coefficient of friction than shoe portion 24 of arresting member 26 such as, for example, a polyurethane material having approximately 60 durometer surface hardness. The contour of the shoe portion 24 of arresting member 26 insures card contact over the complete area of the shoe portion so that the unit stress around the holes in the card will not be sufficient to damage the card. The shoe portion 24 is also relieved in portions which are adjacent the data hole positions as shown in FIG. 4 so that the stress will not cause the area between adjacent data holes to be damaged.

Figure 1A:
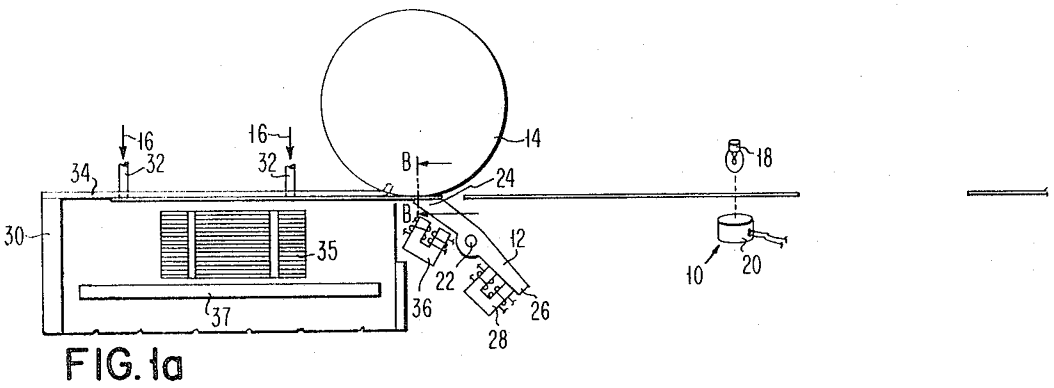

As shown in FIG. 1*a*, the operation of arresting member 26 is timed so that approximately the last half inch of the card is acted on by the arresting member. This timing is necessary to insure that the card, which is moving at a velocity of several hundred inches per second, is not stopped in a position where the following card will strike the trailing edge of the card. The action of the arresting member and the feeding means slows the card to a velocity at which the stacking of the card can safely take place by striking stationary stop 30, which may comprise a resilient material if necessary.

One of the major causes of damage to a card stacked at high speed is caused by relative motion between the cards during which the leading edge of the following card damages the portion of the card between adjacent data holes. To prevent this type of damage, the card is moved laterally from the card path before the next card enters the stacking area. In the embodiment shown in FIG. 1, the lateral motion means comprises a plurality of nozzles 32 mounted to expel a fluid through stacking wall 34 to move the card away from the stacking wall so that the card will not be contacted by the following card. High velocity nozzles are supplied with a suitable source of compressed air such as 10 p.s.i. for 2 to 3 ms. by suitable means (not shown), and the air to the nozzles is controlled by an electromagnetically actuated valve 73. When the feeding means is that described in the above mentioned copending application, a suitable source of compressed air is available therefrom. Once the card is moved away from the stacker wall 34, the cards are stacked and aligned by a conventional joggling mechanism 35 which is normally oscillated or vibrated during operation. The record cards are moved against stacker wall 37 and the stacker wall is moved against a light restraining force in conventional fashion as the pack of cards is moved into the stacker.

The arresting member 26 is reset to the open position by energizing electromagnet 36 as soon as the trailing edge of the first card has passed the arresting position. The current pulses applied to magnets 28, 36 are applied only long enough to attract member 26 to the desired position, and then the current is turned off. The residual magnetism then holds arresting member 26 in this position until the other magnet is energized. Springs cannot be used for the purpose of holding the arresting member in the desired position since the springs do not act fast enough and, additionally, require a much larger magnet force to overcome the spring tension to move the arresting member to the desired position.

Figure 2:
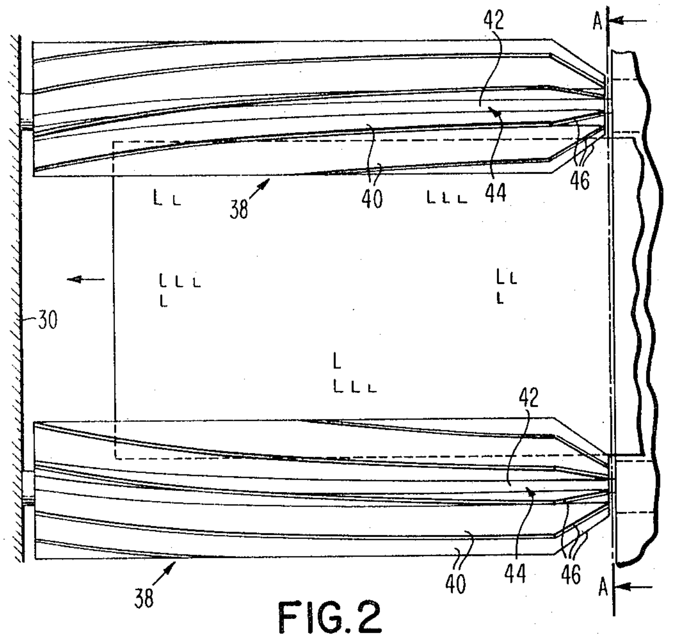
FIG. 2 is a diagrammatic schematic side view of the card stacker embodying the invention wherein an alternate lateral moving means is shown.

An alternate embodiment of the stacking device is shown in FIG. 2. This embodiment may be used for applications in which a source of compressed air is not available or for an application having more stringent noise requirements. The lateral motion device comprises a pair of counter rotating separator members 38, one mounted below the card line and the other mounted above the card line. Each of rotating members 38 comprises a plurality of vane members 40 equally spaced about the periphery of a hub portion 42 of separator member 38. Two adjacent vanes 40 and the enclosed portion of the hub member 42 thus delineate a compartment 44 for each edge of the record cards, which receives the card as it is moved toward stacker end wall 30 and causes the card to be moved to the left (FIG. 3) as members 38 are rotated. The following card enters into the following compartment so that the cards are separated by the vanes of the rotating members. Vanes 40 are skewed at a slight angle so that the trailing edge of the card is moved away from stacker wall 34 first to provide an additional safety factor. The leading edges of the vanes are relieved at an angle so that the leading edges 46 of the vanes 40 can be mounted closer to the feeding means 14. Members 38 are driven by suitable means (not shown), such as gears or belts, from the machine drive motor (not shown) and may be driven at a speed slightly greater than the maximum feed rate for the record cards. This greater speed is to insure that two record cards do not enter the same compartment 44 and damage the cards due to the resulting contact.

Figure 3:
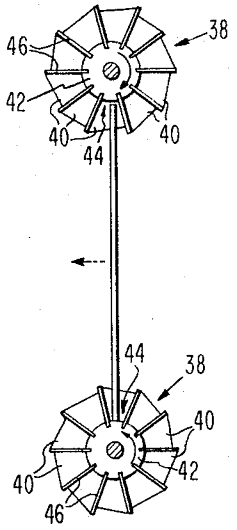
FIG. 3 is a section view along lines A—A of FIG. 2.
Figure 5:
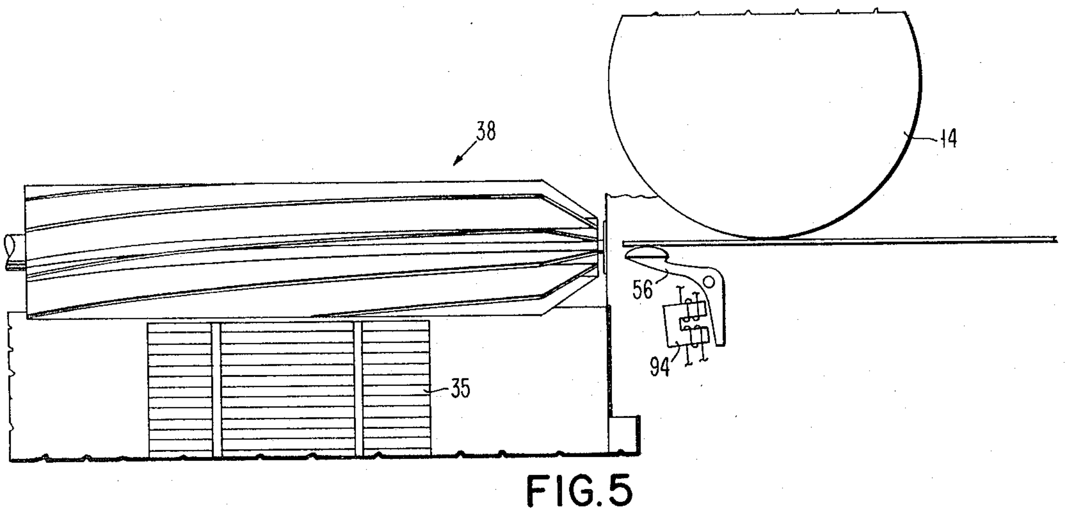
FIG. 5 is a top view of the card stacking device of FIG. 2 showing a card deflecting means.
Figure 6:
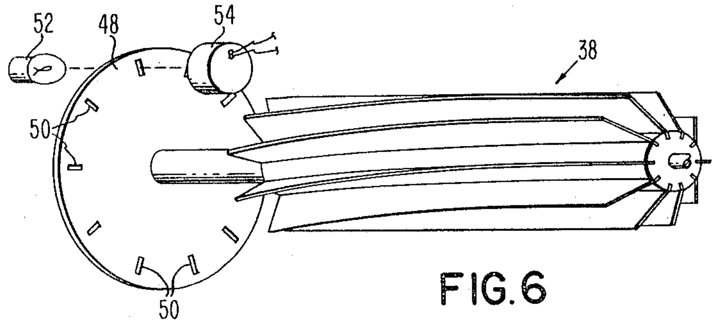
FIG. 6 is a diagrammatic perspective view showing a card feed synchronizing means.
Figure 7:
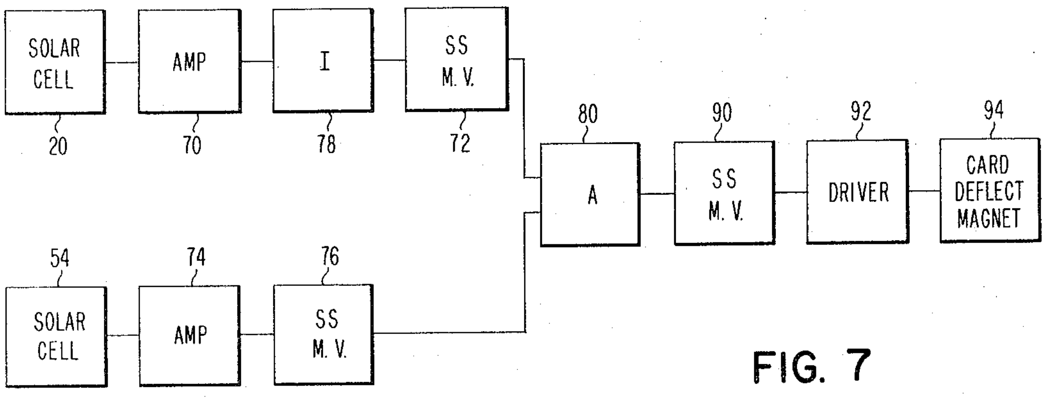
FIG. 7 is a schematic block diagram of the circuits for controlling the card deflecting means of FIG. 5.

A problem may be encountered in utilizing the type of lateral motion means shown in FIG. 2 in a random feed application due to cards being damaged as they strike the leading edges of the vanes when the vanes are aligned with the card path. To prevent this card damage, a synchronizing means is provided. The synchronizing member comprises a disk 48 having perforations 50 in a position corresponding to the position of the vanes of the separator member. A sensing device, such as a lamp 52 and a solar cell 54 for example, is mounted so that an electrical output is received as each of the vanes passes the card line. The signal thus generated is used to synchronize the feeding of cards so that the card arrives at a time when it will not strike any of the vanes. As an alternative, the signal thus generated can be used to actuate a deflecting device when the card arrives in a time zone in which the card will strike a vane. The deflecting device comprises an electromagnetically actuated member having an arm 56 which is normally recessed from the card path. However, when the synchronizing signal indicates that the card will contact a vane, the resulting signal is coupled to actuate the electromagnet to energize the deflecting means. The deflecting means moves the card slightly to the right as shown in FIG. 3 so that the card will enter the compartment 44 to the right of the vane as shown in FIG. 3.

Figure 1B:
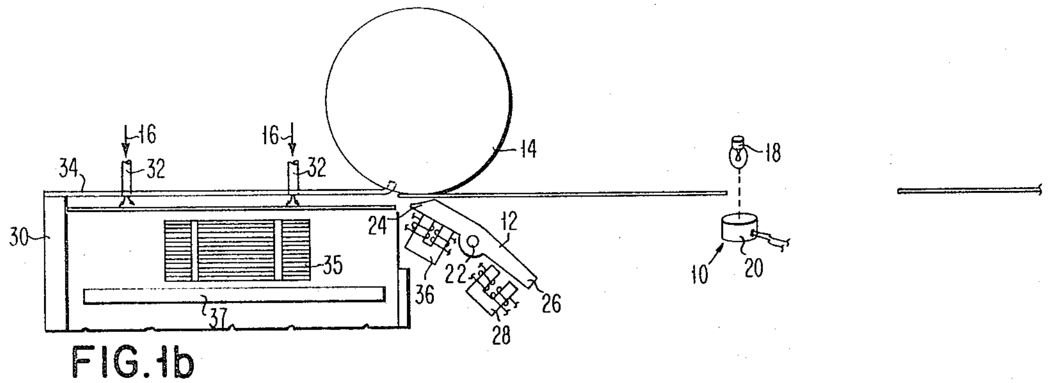
Figure 8:
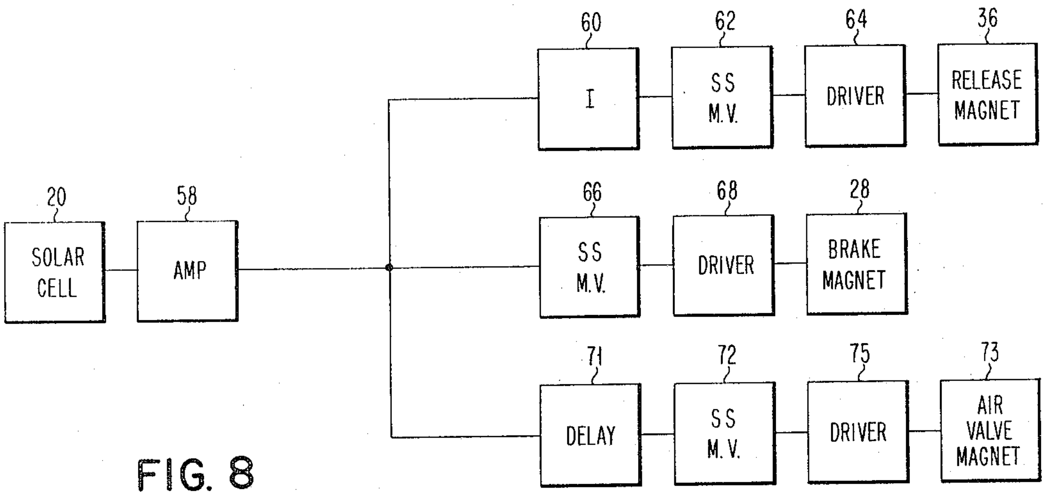
FIG. 8 is a schematic block diagram of the electronic control circuits for controlling the record card stacker shown in FIG. 1.

A schematic block diagram of the control circuit for controlling the stacking device of FIG. 1 is shown in FIG. 8. When the leading edge of a record card interrupts the light beam to solar cell 20, the output goes down, and this output is coupled to an amplifier 58. The output of amplifier 58 is coupled through an inverter 60 to start a single shot multivibrator 62. The output of single shot multivibrator 62 is coupled to a suitable magnet driver 64, which output is coupled to energize the release magnet 36 so that arresting means 26 is opened and the card will pass unimpeded into the stacking area. When the trailing edge of the card passes solar cell 20, an up-level signal is generated which is coupled to amplifier 58. The output of the amplifier is coupled to start a single shot multivibrator 66 which, in turn, energizes driver 68 to actuate brake magnet 28 to close arresting device 26 on the card and thus in conjunction with feed means 14 to slow the card to a velocity at which the card can be safely stacked. The period of the output of single shot multivibrator is set at about 2 ms. since this output is sufficient to attract member 26 to the armature of electromagnet 28. The output of amplifier 58 is also coupled to a delay circuit 71, and the output of delay circuit 71 starts a single shot multivibrator 72 which, in turn, energizes a driver 75, the output of which actuates the electromagnetically operated air valve 73 to turn on the air blast to perform the function of moving the card laterally from the card path so that the following card will not strike the stacked cards. The amount of delay in delay circuit 71 is chosen to represent the time required for the card to move from the position shown in FIG. 1 to the position shown in FIG. 1*b*.

Figure 9:
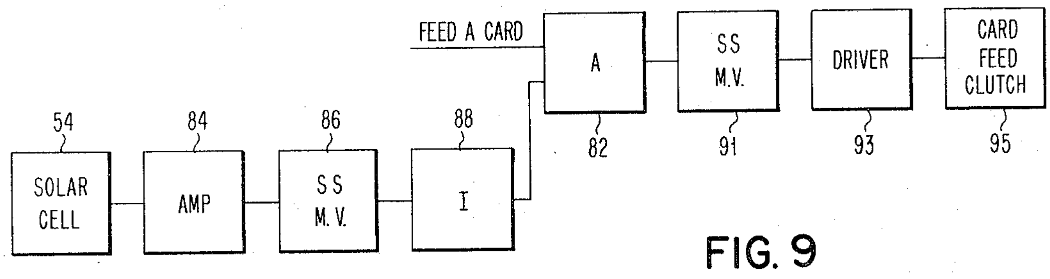
FIG. 9 is a schematic block diagram of the electronic control circuitry for the card stacker having the card separators shown in FIG. 2.

A schematic block diagram of the control circuit for the stacking device shown in FIG. 2 is shown in FIG. 9. In addition to the control circuit shown in FIG. 8, the signal FEED A CARD is an up-level signal which comprises one input to AND circuit 82. The synchronizing signal from solar cell 54 is coupled to amplifier 84, and the output of amplifier 84 is coupled to start single shot multivibrator 86. The output of single shot multivibrator 86 is coupled through inverter 88 to the second input of AND circuit 82. Thus, AND circuit 82 is conditioned when the signal FEED A CARD is present with coincidence of no output from synchronizing solar cell 54, which indicates that no vane is in position to hit a card that is fed at that time. The period of single shot multivibrator 86 output is chosen equal to the time required for a vane to move past the card line to a position in which the vane will not be struck by a card. The output of AND circuit 82 is coupled to turn on single shot multivibrator 91, which energizes driver 93 and card feed clutch 95 to feed a card. In this embodiment, solar cell 54 and lamp 52 must be positioned relative to the card path to compensate for the delay between the time a card feed cycle is initiated and the time the card arrives at the stacking device.

As an alternative to the above method, for avoiding damage due to the card striking the vane the output of solar cell 20 is coupled to an amplifier 70. When the leading edge of a card is sensed, a downlevel is produced. The output of amplifier 70 is coupled through inverter 78 to turn on a single shot multivibrator 72. To prevent unnecessary operation of the deflecting means the output of single shot multivibrator 72 is as short as the electronic circuitry can reliably accept and a typical value is 2 microseconds. The output of single shot multivibrator 72 comprises one input to AND circuit 80. The output of the synchronizing device, solar cell 54, which indicates that a vane is aligned with the card path, is coupled through amplifier 74 to turn on a single shot multivibrator 76. The output of single shot multivibrator 76 comprises the other input to AND circuit 80. The position of solar cell 54 may be adjusted relative to the card line position to compensate for the delay between the time the leading edge of a card is sensed and the time the card reaches the leading edges of card separators 38. The delay may also be compensated by electrical delay in the control circuitry. Thus, upon the coincident presence of the two signals, AND circuit 80 is conditioned to energize single shot multivibrator 90 and driver 92 to actuate the card deflector magnet 94. Thus, the card deflector is energized only when a card arrival at the stacker is timed so that a collision with one of vanes 40 will occur unless the card is deflected.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A device for stacking record cards moving along a card path at a speed of several hundred inches per second and above, comprising:
- card position sensing means for generating a signal indicative of a predetermined position of the card;
- selectively energizable card arresting means comprising a feed means and an arresting member having a shape complementary to said feed means;
- first gating means operable responsive to said signal from said card position sensing means to actuate said card arresting means;
- second gating means for resetting said card arresting means; and
- means for moving the card laterally from said card path.

2. A device for stacking record cards moving along a card path at a speed of several hundred inches per second and above, comprising:
- card position sensing means for generating a signal indicative of a predetermined position of the card;
- selectively energizable card arresting means comprising a feed roll rotating at a slower speed and an arresting member having a shape complementary to said feed roll;
- first gating means operable responsive to said signal from said card position sensing means to actuate said arresting member to move said card into contact with said feed roll to decelerate said card;
- second gating means for resetting said arresting member; and
- means for moving said card laterally from said card path.

3. A device for stacking record cards moving along a card path at a speed of several hundred inches per second and above, comprising:
- card position sensing means for generating a signal indicative of a predetermined position of the card;
- selectively energizable card arresting means comprising a feed means and an arresting member having a shape complementary to said feed means;
- first gating means operable responsive to said signal from said card position sensing means to actuate said card arresting means;
- second gating means for resetting said card arresting means; and
- a selectively actuable fluid stream for moving the card laterally from said card path.

4. A device for stacking record cards moving along a card path at a speed of several hundred inches per second and above, comprising:
- card position sensing means for generating a signal indicative of a predetermined position of the card;
- selectively energizable card arresting means comprising a feed roll rotating at a slower speed and an arresting member having a shape complementary to said feed roll;
- first gating means operable responsive to said signal from said card position sensing means to actuate said arresting member to move said card into contact with said feed roll to decelerate said card;
- second gating means for resetting said arresting member; and
- a selectively actuable fluid stream for moving said card laterally from said card path.

5. A device for stacking record cards moving along a card path at a speed of several hundred inches per second and above, comprising:
- card position sensing means for generating a signal indicative of a predetermined position of the card;
- selectively energizable card arresting means comprising a feed means and an arresting member having a shape complementary to said feed means;
- first gating means operable responsive to said signal from said card position sensing means to actuate said card arresting means;
- second gating means for resetting said card arresting means; and
- rotating separator means for moving the card laterally from said card path.

6. A device for stacking record cards moving along a card path at a speed of several hundred inches per second and above, comprising:
- card position sensing means for generating a signal indicative of a predetermined position of the card;
- selectively energizable card arresting means comprising a feed roll rotating at a slower speed and an arresting member having a shape complementary to said feed roll;
- first gating means operable responsive to said signal from said card position sensing means to actuate said arresting member to move said card into contact with said feed roll to decelerate said card;
- second gating means for resetting said arresting member; and
- rotating separator means for moving said card laterally from said card path.

7. A device for stacking record cards moving along a card path at a speed of several hundred inches per second and above, comprising:
- card position sensing means for generating a signal indicative of a predetermined position of the card;
- selectively energizable card arresting means comprising a feed means and an arresting member having a shape complementary to said feed means;
- first gating means operable responsive to said signal from said card poistion sensing means to actuate said card arresting means;
- second gating means for resetting said card arresting means;
- means for moving the card laterally from said card path comprising a rotating member having a plurality of vanes; and
- means for synchronizing the feeding of cards with the position of the vanes so that no card damage results from the cards striking the vanes.

8. A device for stacking record cards moving along a card path at a speed of several hundred inches per second and above, comprising:

card position sensing means for generating a signal indicative of a predetermined position of the card;

selectively energizable card arresting means comprising a feed roll rotating at a slower speed and an arresting member having a shape complementary to said feed roll;

first gating means operable responsive to said signal from said card position sensing means to actuate said arresting member to move said card into contact with said feed roll to decelerate said card;

second gating means for resetting said arresting member;

means for moving said card laterally from said card path comprising a rotating member having a plurality of vanes; and means for synchronizing the feeding of cards with the position of the vanes so that no card damage results from the cards striking the vanes.

9. A device for stacking record cards moving along a card path, comprising:

card position sensing means for generating a signal indicative of a predetermined position of the card;

selectively energizable card arresting means;

first control means operable responsive to said signal from said card position sensing means to actuate said card arresting means;

means for resetting said card arresting means;

means for moving the card laterally from said card path comprising a rotating member having a plurality of vanes;

synchronizing means for generating a signal indicative of an impending collision between the card and one of said vanes;

card deflecting means; and second control means operable responsive to said synchronizing signal to actuate said card deflecting means so that the collision between the card and the vane is averted.

10. A device for stacking record cards moving at a high speed along a card path, comprising:

card position sensing means for generating a signal indicative of a predetermined position of the card;

selectively energizable card arresting means comprising an arresting member and a feed roll rotating at a slower speed;

first control means operable responsive to said signal from said card position sensing means to actuate said arresting member to move said card into contact with said feed roll to decelerate said card;

means for resetting said arresting member;

means for moving said card laterally from said card path comprising a rotating member having a plurality of vanes;

synchronizing means for generating a signal indicative of an impending collision between the card and one of said vanes;

card deflecting means; and second control means operable responsive to said synchronizing signal to actuate said card deflecting means so that the collision between the card and the vane is averted.

References Cited by the Examiner

UNITED STATES PATENTS

| | | | |
|---|---|---|---|
| 1,107,859 | 8/1914 | Stevens | 271—86 |
| 1,736,482 | 11/1929 | Broadmeyer | 271—86 |
| 2,853,298 | 9/1958 | Faeber | 271—89 X |
| 2,925,271 | 2/1960 | Faeber | 271—87 |
| 3,040,944 | 6/1962 | Anderson | 226—21 |
| 3,087,725 | 4/1963 | Duncan | 271—71 |
| 3,154,307 | 10/1964 | Williamson | 271—71 |
| 3,223,409 | 12/1965 | Eissfeld et al. | 271—71 |

References Cited by the Applicant

UNITED STATES PATENTS

| | | |
|---|---|---|
| 2,964,314 | 12/1960 | Fiehl. |

M. HENSON WOOD, Jr., *Primary Examiner.*

J. N. ERLICH, *Assistant Examiner.*